United States Patent
Saha et al.

(10) Patent No.: US 10,664,383 B2
(45) Date of Patent: May 26, 2020

(54) AUTOMATED SOFTWARE PROGRAM REPAIR OF SIMILAR CODE SNIPPETS

(71) Applicant: FUJITSU LIMITED, Kawasaki-shi, Kanagawa (JP)

(72) Inventors: Ripon K. Saha, Santa Clara, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/109,348

(22) Filed: Aug. 22, 2018

(65) Prior Publication Data
US 2020/0065226 A1 Feb. 27, 2020

(51) Int. Cl.
G06F 9/44 (2018.01)
G06F 11/36 (2006.01)

(52) U.S. Cl.
CPC ...... *G06F 11/3616* (2013.01); *G06F 11/3664* (2013.01)

(58) Field of Classification Search
CPC ............. G06F 11/3616; G06F 11/3688; G06F 11/3692; G06F 11/0793; G06F 11/3604; G06F 8/36; G06F 8/71; G06F 21/577
See application file for complete search history.

(56) References Cited

U.S. PATENT DOCUMENTS

| | | | |
|---|---|---|---|
| 8,756,576 B2 * | 6/2014 | Balasubramanian | G06F 8/33 717/101 |
| 9,846,637 B2 | 12/2017 | Yoshida et al. | |
| 10,114,624 B1 * | 10/2018 | Makkar | G06F 8/72 |
| 2011/0246968 A1 * | 10/2011 | Zhang | G06F 8/751 717/125 |
| 2015/0331674 A1 * | 11/2015 | Ng | G06F 8/30 717/109 |
| 2017/0060735 A1 | 3/2017 | Yoshida et al. | |
| 2017/0185783 A1 * | 6/2017 | Brucker | G06F 21/577 |
| 2017/0242782 A1 | 8/2017 | Yoshida et al. | |
| 2018/0089065 A1 | 3/2018 | Yoshida et al. | |
| 2018/0165182 A1 | 6/2018 | Yoshida et al. | |

(Continued)

OTHER PUBLICATIONS

U.S. Appl. No. 15/648,441, filed Jul. 12, 2017.

(Continued)

*Primary Examiner* — Duy Khuong T Nguyen
(74) *Attorney, Agent, or Firm* — Maschoff Brennan (57) ABSTRACT

Operations may include obtaining a first code snippet associated with a fault location of a fault of the software program. The operations may further include obtaining a second code snippet. In addition, the operations may include determining element similarity between first elements of the first code snippet and second elements of the second code snippet. Further, the operations may include generating, based on the determined element similarity, an element map that maps the first elements of the first code statement to the second elements of the second code statement. The operations may further include obtaining an abstract program modification as a repair candidate of the fault. In addition, the operations may include generating a first repair based on the abstract program modification and the element map. Moreover, the operations may include generating a second repair based on the abstract program modification and the element map.

20 Claims, 3 Drawing Sheets

(56) References Cited

U.S. PATENT DOCUMENTS

2018/0349105 A1* 12/2018 Makkar ............... G06F 8/36
2019/0079741 A1* 3/2019 Makkar ............... G06F 8/33

OTHER PUBLICATIONS

Tassey, Gregory. "The economic impacts of inadequate infrastructure for software testing." National Institute of Standards and Technology, RTI Project 7007.011 (2002).
"Cambridge University Study States Software Bugs Cost Economy $312 Billion Per Year", Retrieved on: Aug. 18, 2018, Retrieved From: http://www.prweb.com/releases/2013/1/prweb10298185.htm.
Qi, et al., "An Analysis of Patch Plausibility and Correctness of Generate-And-Validate Patch Generation System", ISSTA, Jul. 15, 2015.
U.S. Appl. No. 15/436,595, filed Feb. 17, 2017.
Long et al., "Fully Convolutional Networks for Semantic Segmentation", POPL, Jan. 2015.
Long et al., "Stage Program Repair with Condition Synthesis", FSE. Aug. 30, 2015.
Kim et al., "Automatic Patch Generation Learned from Human-Written Patches", ICSE, May 18, 2013.
Tan et al., "Anti-patterns in Search-Based Program Repair", FSE, Nov. 13, 2016.
U.S. Appl. No. 15/822,106, filed Nov. 24, 2017.
Nguyen et al., "SemFix: Program Repair via Semantic Analysis", ICSE', May 2013, pp. 772-781.
DeMarco et al., "Automatic Repair of Buggy If Conditions and Missing Preconditions with SMT", CSTVA, May 31, 2014.
Kaleeswaran, et al., "MintHint: Automated Synthesis of Repair Hints", ICSE, May 31, 2014.
Mechtaev et al., "DirectFix: Looking for Simple Program Repairs", ICSE, May 16, 2015, pp. 448-458.
Mechtaev et al., "Angelix: scalable multiline program patch synthesis via symbolic analysis", ICSE, May 14, 2016.
Le Goues et al., "A Systematic Study of Automated Program Repair: Fixing 55 out of 105 Bugs for $8 Each", ICSE, Jun. 22, 2013, pp. 3-13.
Tan et al., "Relifix: Automated Repair of Software Regressions," ICSE, Aug. 17, 2015.
Weimer et al., "Automatically Finding Patches Using Genetic Programming", ISCE, May, 16, 2009.

\* cited by examiner

AUTOMATED SOFTWARE PROGRAM REPAIR OF SIMILAR CODE SNIPPETS

FIELD

The embodiments discussed in the present disclosure are related to automated software program repair of similar code snippets.

BACKGROUND

Software programs often have faults in them (commonly referred to as "bugs") in which they may not operate as intended. Often automated repair systems are used in attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include obtaining a first code snippet that includes one or more lines of code that are adjacent to a first code statement of a software program. The first code statement may be identified as a fault location of a fault of the software program. The operations may further include obtaining a second code snippet that includes one or more lines of code that are adjacent to a second code statement that is identified as being similar to the first code statement. In addition, the operations may include performing an element similarity analysis between first elements of the first code snippet and second elements of the second code snippet. Further, the operations may include determining, based on the element similarity analysis, which of the first elements and the second elements satisfy an element similarity threshold with respect to each other. In addition, the operations may include mapping the first elements to respective second elements with which the first elements satisfy the element similarity threshold and generating an element map that indicates the mapping of the first elements to the respective second elements The operations may further include obtaining an abstract program modification as a repair candidate of the fault. In addition, the operations may include generating a first repair for implementation with respect to the first code snippet in which the first repair is based on the abstract program modification and the element map. Moreover, the operations may include generating a second repair for implementation with respect to the second code snippet in which the second repair is based on the abstract program modification and the element map. The operations may also include implementing the first repair at the first code snippet and implementing the second repair at the second code snippet.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Software programs may include multiple snippets of code that are similar to each other. In some instances, the similar code snippets (commonly referred to as "code-clones") may be similar due to a software developer using code with a particular functionality as a base for portions of the software program that use the particular functionality. However, despite the use of the term "code-clones", code-clones may not be identical to each other because developers often modify the base code according to the particular implementation.

The propagation of code-clones may help improve the efficiency in generating code for a particular software program. However, the propagation of code-clones may also propagate faults (also referred to as "bugs" or "errors") throughout the software program in instances in which the base code used has one or more faults. For example, in instances in which a fault is identified in a particular code-clone, it may be very likely that related code-clones (in the present disclosure code-clones that are based on the same base code may be referred to as "related code-clones") also have the same type of fault. However, the lack of identicalness between related code-clones that are based on the same base code may make it difficult to identify the related code-clones that likely have the same type of fault and may make it difficult to generate a common repair that may be used to correct corresponding faults.

Some embodiments described in the present disclosure relate to methods and systems of automatically identifying code-clones that may be related to each other and that may include a fault. As detailed below, the identification of related code-clones may include the generation of an element map that correlates elements of the related code-clones that correspond to each other and that correlates corresponding elements with a generic element. Additionally or alternatively, an abstraction of a modification in the software program ("abstract program modification") may be selected as a repair candidate for repairing the fault. In these or other embodiments, as detailed below, specific repairs may be generated for the individual code-clones using the abstract program modification and the element map.

As such, related code-clones with the same type of fault may be repaired in a multi-chunk manner as opposed to being repaired in a single-chunk manner that does not take the presence of code-clones in consideration. Embodiments of the present disclosure may thus improve software repair tools and software programs by increasing the ability of the software repair tools to identify code-clones that may have faults and to implement repairs to the faults in a more efficient and faster manner than other techniques. In particular, the identification of code-clones of the code of one fault location may allow for identification and repair of related faults at the related code-clones, even in instances in which the code of the related code-clones may be similar, but not identical.

Embodiments of the present disclosure are explained with reference to the accompanying drawings.

Figure 1:
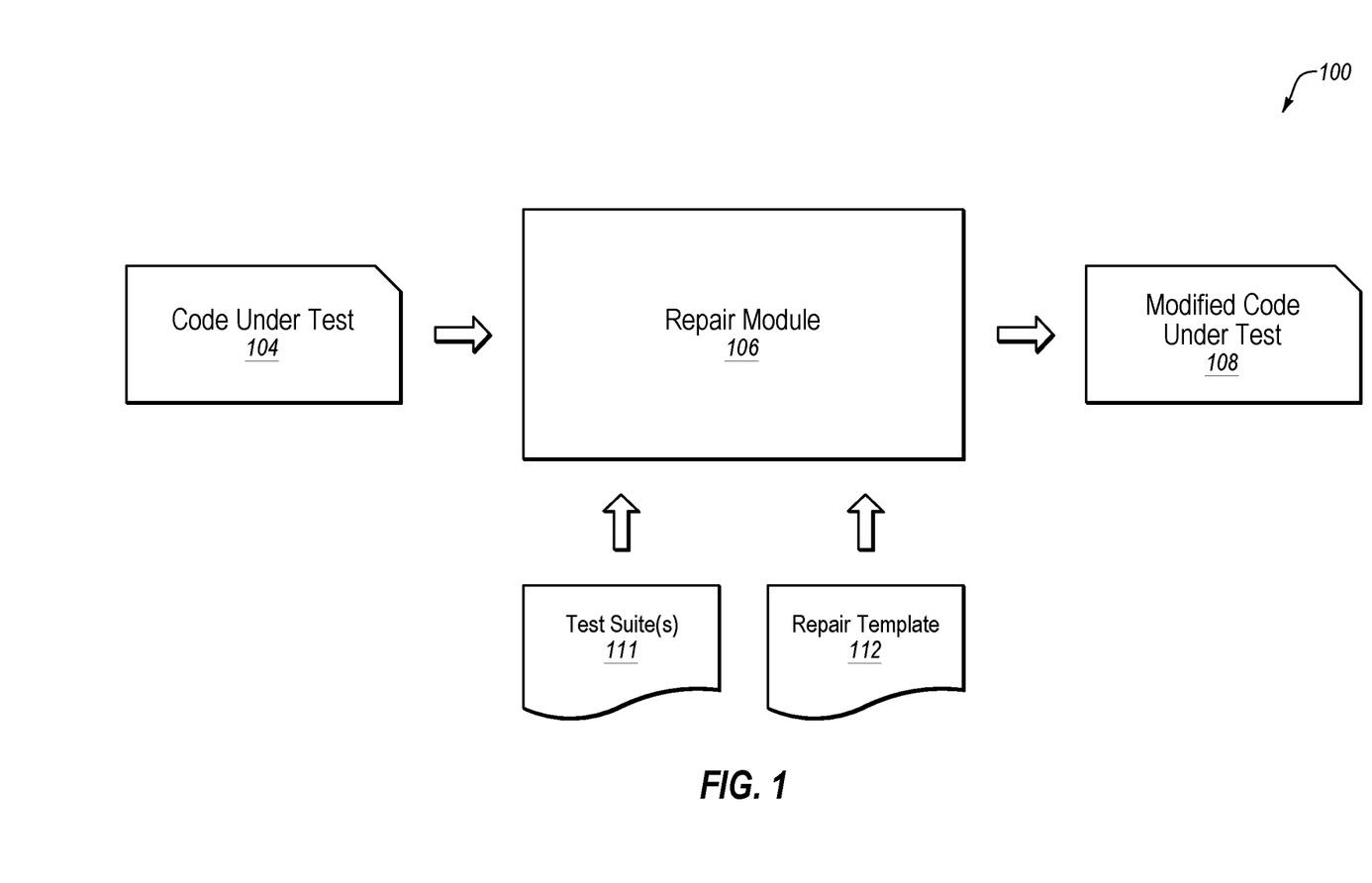
FIG. 1 is a diagram representing an example environment related to repairing a software program.

FIG. 1 is a diagram representing an example environment 100 related to repairing a software program, arranged in accordance with at least one embodiment described in the present disclosure. The environment 100 may include a repair module 106 configured to analyze code under test 104 for faults. The repair module 106 may also be configured to output modified code under test 108, which may include one or more modifications made to the code under test 104 by repair operations performed by the repair module 106.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as "correct") one or more faults in the code under test 104. In some embodiments, the repair module 106 may be configured to perform one or more of the repair operations based on a repair template 112 and one or more test suites 111.

The repair template 112 may include any suitable type of instructions or routines that, when executed, may be configured to implement one or more modifications with respect to the code under test 104 in response to the presence of faults in the code under test 104. The modifications may include changes in the code under test 104 that may repair or attempt to repair the faults. In the present disclosure, the modifications that may be performed may be referred to as "repair candidates" or "repairs."

The test suites 111 may include one or more routines that may act as test cases for the code under test 104. The test suites 111 may be configured to determine whether the code under test 104 behaves in a specified manner. The test suites 111 may be configured according to any suitable technique.

The repair module 106 may be configured to apply one or more of the test suites 111 with respect to the code under test 104 to detect or determine one or more faults and corresponding fault locations in the code under test 104. In some embodiments, the repair module 106 may be configured to execute one or more tests included in the test suites 111, which may be referred to as performing a test execution. A test execution that passes may be referred to as a "passing test execution" and a test execution that fails may be referred to as a "failing test execution." In some embodiments, a fault location and corresponding fault of the code under test 104 may be identified based on a failing test execution executing code appearing at the fault location.

In some embodiments, the repair module 106 may be configured to obtain a particular code statement that may be identified as a fault location based on the application of the one or more test suites 111 to the code under test 104. In these or other embodiments, the repair module 106 may be configured to determine a similarity between the particular code statement and each of one or more other code statements of the code under test 104. In some embodiments, the repair module 106 may be configured to determine the similarity between the particular code statement and each of one or more other code statements that are also identified as fault locations. In these or other embodiments, the repair module 106 may be configured to determine the similarity between the particular code statement and each of all of the other code statements that are also identified as fault locations. Additionally or alternatively, the repair module 106 may be configured to determine the similarity between the particular code statement and only other code statements that are also identified as fault locations such that code statements that are not identified as fault locations may be ignored. The ignoring of code statements that are not identified as fault locations may increase the speed of the repair module 106 with respect to generating the modified code under test 108.

In some embodiments, the repair module 106 may be configured to determine the similarity between the particular code statement and the other code statements based on a textual similarity between the particular code statement and the other code statements. For example, the repair module 106 may be configured to determine a textual similarity between the identifiers of elements (e.g., variable names, object names, method names, etc.) of the particular code statement with the identifiers of elements of the other code statements. In these or other embodiments, the textual similarity analysis may be performed with respect to individual identifiers, strings of identifiers as included in the particular code statement and the other code statements, the entire particular code statement and the entire other code statement, or any combination thereof.

In some embodiments, the repair module 106 may be configured to determine a textual similarity score of the particular code statement with respect to each of the other code statements. For example, in some embodiments, the repair module 106 may be configured to apply a Levenshtein distance dissimilarity algorithm ("Levenshtein algorithm") to the element identifiers to determine textual similarity between the element identifiers and generate a statement textual similarity score. Other example techniques that may be used for determining textual similarity between the particular code statement and the other code statements may include a longest common subsequence determination and a Jaccard coefficient determination.

In these or other embodiments, the repair module 106 may determine whether the textual similarity between the particular code statement and one or more of the other code statements satisfies a textual similarity threshold based on the statement textual similarity scores. For instance, the Levenshtein algorithm may be modified (e.g., by subtracting the score output by the Levenshtein algorithm from "1") to output a score between "0" and "1" with respect to textual similarity in which a score of "1" indicates identical textual similarity and a score of "0" indicates no textual similarity. In some embodiments, the repair module 106 may be configured to determine that the particular code statement is sufficiently similar to one or more of the other code statements in response to the textual similarity score being greater than a textual similarity threshold of "0.9." The textual similarity threshold may vary depending on different implementations and similarity scoring mechanisms used. In some embodiments, the repair module 106 may be configured to determine that the particular code statement is similar to another code statement in response to determining that the textual similarity between the statements satisfies the textual similarity threshold.

Additionally or alternatively, the repair module 106 may be configured to determine the similarity between the particular code statement and the other code statements based on a statement type similarity between the elements of the particular code statement and the elements of the other code statements. For example, each of code statements may be of a certain type of statement such as an assignment statement, a method invocation, an "if" statement, a "for" statement, a "return" statement, a "try-catch" statement, a "switch" statement, a "throw" statement, a "continue/break" statement, a constructor statement, etc. The repair module 106 may be configured to determine whether the particular code statement is of the same type as one or more of the other code statements.

In some embodiments, the repair module 106 may be configured to determine whether the particular code statement is of the same type as one or more of the other code statements based on node types of statement nodes of an Abstract Syntax Tree ("AST") that may be generated for the code under test 104. For example, the AST may include a particular statement node that represents the particular code statement and may include other statement nodes that each represent a different one of the other code statements. In some embodiments, the repair module 106 may be configured to determine whether the particular statement node that represents the particular code statement is of the same type as the statement nodes that represent the other code statements. In response to determining that the AST node type of the particular statement node is the same as a particular other statement node, the repair module 106 may determine that the particular code statement is of the same expression type as another particular code statement that is represented by the particular other statement node.

In some embodiments, the repair module 106 may be configured to determine a statement type similarity score that may indicate whether statements are of the same type or not. For example, in some embodiments, the repair module 106 may be configured to generate a Boolean type score in which a score of "0" may indicate that the statement types are not the same and in which a score of "1" may indicate that the statement types are the same. In these or other embodiments, the statement type similarity score may be determined in any other suitable manner. Additionally or alternatively, the statement type similarity score may be based on a non-Boolean scoring in which similarities between certain statement types may be taken into consideration. In some embodiments, the repair module 106 may be configured to determine that the particular code statement is similar to another code statement in response to determining that the statement types are the same.

Additionally or alternatively, the repair module 106 may be configured to determine the similarity between the particular code statement and the other code statements based on an expression type similarity between the elements of the particular code statement and the elements of the other code statements. For example, each of the elements may be of a certain type of expression such as a variable access, a field access, an array accesses, a method/constructor invocation, an object access, conditionals, literals, etc. The repair module 106 may be configured to determine whether elements of the particular code statement are of the same type of expression as elements of the other code statements.

In some embodiments, the repair module 106 may be configured to determine whether the elements are of the same type based on node types of element nodes of the AST that may be generated for the code under test 104. For example, the AST may include a particular element node that represents a particular element of the particular code statement and may include other element nodes that each represent a different element of one or more of the other code statements. In some embodiments, the repair module 106 may be configured to determine whether the particular element node that represents the particular element is of the same type as the element nodes that represent the elements of one or more of the other code statements. In response to determining that the AST node type of the particular element node is the same as a particular other element node, the repair module 106 may determine that the particular element is of the same element type as a particular other element that is represented by the particular other element node.

In some embodiments, the repair module 106 may be configured to determine an expression type similarity score that may indicate whether expressions are of the same type or not. For example, in some embodiments, the repair module 106 may be configured to generate a Boolean type score in which a score of "0" may indicate that the expression types are not the same and in which a score of "1" may indicate that the expression types are the same. In these or other embodiments, the expression type similarity score may be determined in any other suitable manner. Additionally or alternatively, the expression type similarity score may be based on a non-Boolean scoring in which similarities between certain expression types may be taken into consideration. In some embodiments, the repair module 106 may be configured to determine that the particular code statement is similar to another code statement in response to determining that the expression type similarities of a threshold number of expressions are the same.

Additionally or alternatively, in some embodiments, the repair module 106 may be configured to determine the similarity between the particular code statement and the other code statements based on a data type similarity between the elements of the particular code statement and the elements of the other code statements. For example, each of the elements may be of a certain type of data such as an integer, a floating point number, a character, a string, a double, a vector, a location, etc. or any other data type that may be defined. The repair module 106 may be configured to determine whether the data types of the elements of the particular code statement are of the same data type as elements of the other code statements.

In some embodiments, the repair module 106 may be configured to determine whether the data types are the similar or compatible based on a textual similarity analysis of the identifiers of the data types or class hierarchy analysis. For example, in some embodiments, the repair module 106 may be configured to apply the Levenshtein algorithm or Longest Common Subsequence algorithm or Jaccard Coefficient to the data type identifiers to determine textual similarity between the data type identifiers and to generate a corresponding textual similarity score that may be used as a data type similarity score. Type compatibility also may be checked through class hierarchy, i.e., super class-sub class relationship.

In these or other embodiments, the repair module 106 may determine that the textual similarity between a data type identifier of a particular element of the particular code statement and one or more other data type identifiers of one or more elements of one or more of the other code statements satisfies a textual similarity threshold based on the corresponding data type similarity scores. For instance, as indicated above, the Levenshtein algorithm may be modified to output a score between "0" and "1" with respect to textual similarity of the data type identifiers in which a score of "1" indicates identical textual similarity and a score of "0" indicates no textual similarity. In some embodiments, the repair module 106 may be configured to determine that the data type identifier is sufficiently similar to the one or more other data type identifiers in response to the corresponding textual similarity scores being greater than a textual similarity threshold of "0.9." The textual similarity threshold may vary depending on different implementations and similarity scoring mechanisms used. In some embodiments, the repair module 106 may be configured to determine that the particular code statement is similar to another code statement in response to determining that the data type identifier similarities of a threshold number of data types satisfy the data type similarity threshold.

Additionally or alternatively, in some embodiments, the repair module 106 may be configured to determine the similarity between the particular code statement and the other code statements based on structural similarity between the particular code statement and the other code statements. The structure of the code statements may include placement of certain elements of the codes statements in which structural similarity may be based on whether similar elements are in similar locations in the code statements.

For example, in some embodiments, the structural similarity of the code statements may be determined based on the AST that may be generated for the code under test 104. For instance, as indicated above, the AST may include nodes that may be represent the code statements and the elements of the code statements. The nodes that correspond to the particular code statement may be organized as a particular sub-AST tree in a hierarchal manner based on the structure of the particular code statement and the locations of the elements that are included in the particular code statement. The other nodes that correspond to the other code statements may be similarly organized as other sub-AST trees that may each correspond to a different one of the other code statements. In some embodiments, the hierarchal structure and organization of the nodes of the particular sub-AST tree may be compared against the hierarchal structure and organization of each of the other sub-AST trees to determine similarities between the sub-AST tree and the other sub-AST trees. The repair module 106 may be configured to determine the similarities in the hierarchal structures using any suitable technique. For example, in some embodiments, the repair module 106 may be configured to determine the similarities in the hierarchal structures using a Jaccard Coefficient determination, a tree edit distance algorithm such as a Zhang and Sasha tree edit distance algorithm, or any other suitable technique.

In some embodiments, the repair module 106 may be configured to generate a structural similarity score with respect to the particular code statement and each of the other code statements. In these or other embodiments, each structural similarity score may indicate the structural similarity between the particular code statement and a corresponding other code statement.

In these or other embodiments, the repair module 106 may determine that the structural similarity between the particular code statement and one or more of the other code statements satisfies a structural similarity threshold based on the corresponding structural similarity scores. For instance, a tree distance algorithm (e.g., Zhang and Sasha tree edit distance algorithm modified to output a similarity score rather than a dissimilarity score) may output a score between "0" and "1" with respect to distance similarity of the sub-AST trees at issue (e.g., the particular sub-AST tree and one of the other sub-AST trees). In these or other embodiments, a score of "1" may indicate identical structural similarity and a score of "0" may indicate no structural similarity. In some embodiments, the repair module 106 may be configured to determine that the structure is sufficiently similar in response to the structural similarity score being greater than a structural similarity threshold of "0.8." The structural similarity threshold may vary depending on different implementations and similarity scoring mechanisms used. In some embodiments, the repair module 106 may be configured to determine that the particular code statement is similar to another code statement in response to determining that the structural similarity satisfies the structural similarity threshold.

Additionally or alternatively, in some embodiments, the repair module 106 may be configured to determine the similarity between the particular code statement and the other code statements based on application program interfaces ("API") use by the particular code statement and the other code statements. For example, the repair module 106 may be configured to determine whether the particular code statement and one or more of the other code statements include calls to the same or similar APIs. In these or other embodiments, the repair module 106 may be configured to determine that the particular code statement may be similar to another particular code statement in response to determining that the particular code statement and the other particular code statement include calls to the same API or to similar APIs.

The repair module 106 may be configured to determine whether the particular code statement and one or more of the other code statements include calls to the same or similar APIs using any suitable technique. For example, in some embodiments, the repair module 106 may be configured to determine whether the particular code statement and one or more of the other code statements include calls to the same or similar APIs by performing a textual analysis on API identifiers that may be included in the particular code statement and the other code statements. For example, in some embodiments, the repair module 106 may be configured to apply the Levenshtein algorithm to the API identifiers to determine textual similarity between the data type identifiers and to generate a corresponding textual similarity score that may be used as an API similarity score.

In these or other embodiments, the repair module 106 may determine that the textual similarity between a particular identifier of a particular API of the particular code statement and one or more other identifiers of APIs of one or more of the other code statements satisfies a textual similarity threshold based on the corresponding API similarity scores. In these or other embodiments, the repair module 106 may be configured to determine that the particular code statement uses a same or similar API as another particular code statement in response to the corresponding API similarity score determined with respect to the particular code statement and the other particular code statement satisfying the textual similarity threshold.

In some embodiments, in determining the similarity between code statements, the repair module 106 may use any combination of the code statement textual similarity determinations, the statement type similarity determinations, the expression type similarity determinations, the data type similarity determinations, the structural similarity determinations, and the API use determinations. For example, in some embodiments, the repair module 106 may generate an aggregate statement similarity score between the particular code statement and each of the other code statements based on scores related to two or more of the code statement textual similarity determinations, the statement type similarity determinations, the expression type similarity determinations, the data type similarity determinations, the structural similarity determinations, and the API use determinations. In these or other embodiments, the repair module 106 may weigh the different determinations differently in generating the aggregate statement similarity score. Additionally or alternatively, in some embodiments, the repair module 106 may be configured to determine that the particular code statement is similar to another code statement in response to determining that the aggregate statement similarity score satisfies a particular threshold. In the present disclosure any similarity determination or combination of similarity determinations that may be used to determine the similarity between code statements may be referred to as a "statement similarity determination." Moreover, any score or combination of scores that may be used to determine the similarity between code statements may be referred to as a "statement similarity score." In addition, any threshold or combination of thresholds that may be used to determine whether code statements may be deemed as "being similar" may be referred to as a "statement similarity threshold."

In some embodiments, the repair module 106 may be configured to generate a particular code snippet that includes one or more lines of code that may be adjacent to the particular code statement. For example, the particular code snippet may include one or more lines of code that immediately precede the particular code statement and/or one or more lines of code that immediately follow the particular code statement. The number of lines of code that may be included in the particular code snippet may vary depending on particular implementations.

In these or other embodiments, the repair module 106 may be configured to generate one or more other code snippets. Each of the other code snippets may include one or more lines of code that may be adjacent to one of the other code statements that may be determined as being similar to the particular code statement such as described above. In some embodiments, the other code statements that are determined as being similar to the particular code statement may be referred to as "similar other statements." In some embodiments, the other code snippets may be generated with respect to the similar other statements in response to the similar other statements being determined as being similar to the particular code statement.

The other code snippets may be obtained in the same manner that the particular code snippet is obtained. For example, in some instances, the particular code snippet may include three lines of code: the line of code that immediately precedes the particular code statement, the particular code statement, and the line of code that immediately follows the particular code statement. In these or other embodiments, each of the other code snippets may also include three lines of code: the line of code that immediately precedes the respective similar other statement, the respective similar other statement, and the line of code that immediately follows the respective similar other statement.

In some embodiments, the repair module 106 may be configured to determine a similarity between elements of the particular code snippet and elements of the other code snippets. For example, in some embodiments, the repair module 106 may be configured to determine a textual similarity between the identifiers of the elements, an expression similarity between the elements, and/or a data type similarity between the elements such as described above. In some embodiments, the repair module 106 may be configured to determine the similarity between each element and each of the other elements. In these or other embodiments, the repair module 106 may be configured to determine one or more similarity scores such as described above that may indicate the similarity between certain elements. In these or other embodiments, such as described above, an aggregate similarity score may be determined based on two or more of the similarity scores.

In these or other embodiments, the repair module 106 may be configured to determine that certain elements are similar to each other in response to the similarity determination between those elements satisfying a threshold. For example, the repair module 106 may be configured to determine that two elements are similar to each other based on an element similarity score (e.g., a textual similarity score associated with the identifiers of the elements) that indicates a similarity between the two elements satisfying an element similarity threshold. In the present disclosure any similarity determination or combination of similarity determinations that may be used to determine the similarity between elements may be referred to as an "element similarity determination." Moreover, any score or combination of scores that may be used to determine the similarity between elements may be referred to as an "element similarity score." In addition, any threshold or combination of thresholds that may be used to determine whether elements may be deemed as "being similar" may be referred to as an "element similarity threshold."

In these or other embodiments, the repair module 106 may be configured to generate an element map that maps together elements of the code snippets that are determined to be similar to each other. For example, the repair module 106 may determine that a first element "e1" of the particular code snippet is similar to a second element "e2" of another particular code snippet. In response to such a determination, the repair module 106 may map "e1" to "e2." In these or other embodiments, the repair module 106 may be configured to map a generic element to elements that are determined to be similar to each other. For example, the repair module 106 may be configured to generate a generic element "x1" that may be mapped to elements "e1" and "e2" and any other elements that may be determined to be similar to and that may be mapped to elements "e1" and "e2."

In these or other embodiments, the repair module 106 may be configured to map together data types of the code snippets that may be determined to be similar to each other and to include the data type mapping in the element map. For example, in some embodiments, the repair module 106 may be configured to determine whether two data types are similar based on the data type similarity analysis, such as described above. In response to determining that two data types are similar, the repair module 106 may map the two data types to each other. For instance, the repair module 106 may determine that a first data type "T1" of the particular code snippet is similar to a second data type "T2" of the other particular code snippet. In response to such a determination, the repair module 106 may map "T1" to "T2." In these or other embodiments, the repair module 106 may be configured to map a generic data type to data types that are determined to be similar to each other. For example, the repair module 106 may be configured to generate a generic data type "X1" that may be mapped to data types "T1" and "T2" and any other data types that may be determined to be similar to and that may be mapped to data types "T1" and "T2."

In some embodiments, the repair module 106 may be configured to generate one or more abstract code snippets based on the code snippets and the element map. For example, the repair module 106 may be configured to replace the elements of the code snippets that are included in the element map with the respective generic elements that are mapped to the elements to generate the abstract code snippets. Additionally or alternatively, the repair module 106 may be configured to replace the data types of the code snippets that are included in the element map with the respective generic data types that are mapped to the data types as part of generation of the abstract code snippets.

For instance, the repair module 106 may be configured to generate a particular abstract code snippet that corresponds to the particular code snippet. As part of the generation of the particular abstract code snippet, the repair module 106 may be configured to replace the first element "e1" of the particular code snippet with the generic element "x1." In these or other embodiments, as part of the generation of the particular abstract code snippet, the repair module 106 may be configured to replace the first data type "T1" with the generic data type "X1."

As another example, the repair module 106 may be configured to generate another particular abstract code snippet that corresponds to the other particular code snippet that includes the second element "e2" and the second data type "T2." As part of the generation of the other particular abstract code snippet, the repair module 106 may be configured to replace the second element "e2" with the generic element "x1." In these or other embodiments, as part of the generation of the other particular abstract code snippet, the repair module 106 may be configured to replace the second data type "T2" with the generic data type "X1."

In some embodiments, the repair module 106 may be configured to determine whether code snippets are related code-clones based on the abstract code snippets. For example, in some embodiments, the repair module 106 may be configured to determine a snippet similarity between the abstract code snippets to determine whether the code snippets that correspond to the abstract code snippets are related code-clones. For instance, in some embodiments, the repair module 106 may be configured to determine that the particular abstract code snippet and the other particular abstract code snippet described above are the same in response to the snippet similarity determination.

In these or other embodiments, the repair module 106 may be configured to determine that the particular abstract code snippet and the other particular abstract code snippet described above are the same in response to all of certain elements (referred to as "elements of interest") being the same in the respective abstract code snippets even if the particular abstract code snippet and the other particular abstract code snippet are not exactly the same in every regard. In some embodiments, the elements of interest may include elements that may be added, deleted, or modified during repair operations. In response to determining that the particular abstract code snippet and the other particular abstract code snippet are the same, the repair module 106 may be configured to determine that the particular code snippet and the other particular code snippet are related code-clones.

In these or other embodiments, rather than generating separate abstract code snippets for each of the code snippets, the repair module 106 may be configured to determine the snippet similarity between code snippets based on the element map. For example, in some embodiments, the repair module 106 may be configured to determine from the element map that elements of interest of different code snippets are mapped to each other in the element map. In response to the elements of interest being mapped to each other, the repair module 106 may determine that the corresponding code snippets are related code-clones with respect to each other. In these or other embodiments, in response to the elements of interest being mapped to each other, the repair module 106 may be configured to generate a common abstract code snippet for the code snippets based on the mapping of the elements of interest to the generic elements in the element map.

By way of example, the particular code snippet may include a first set of elements of interest and the other particular code snippet may include a second set of elements of interest. Each element of the first set of elements of interest may be mapped to a different element of the second set of elements of interest in the element map. The repair module 106 may be configured to thus determine that the elements of interest of the particular code snippet and the other particular code snippet are mapped to each other. In response to such a determination, the repair module 106 may be configured to determine that the particular code snippet and the other particular code snippet are related code-clones and/or may generate a common abstract code snippet for the particular code snippet and the other particular code snippet.

In these or other embodiments, the repair module 106 may be configured to obtain a repair candidate from the repair template 112 as a potential program modification that may be made to code snippets that are determined to be related code-clones. In some embodiments, the obtained repair candidate may be an abstract program modification in that the repair candidate may have generic placeholders for the different elements and data types of the repair candidate.

In these or other embodiments, the repair module 106 may be configured to concretize the abstract program modification using the element map. For example, the repair module 106 may be configured to replace the generic placeholders of the repair candidate with generic elements and generic data types of the element map that correspond to the generic placeholders. For example, the repair candidate may include a particular generic placeholder for an object and the generic element "x1" may correspond to an object. The repair module 106 may accordingly replace the particular generic placeholder with the generic element "x1."

Additionally or alternatively, the repair module 106 may further concretize the now modified repair candidate by generating a specific repair for each of the related code-clones based on the modified repair candidate and the element map. For example, the particular code snippet and the other particular code snippet discussed above may be determined to be related code-clones with respect to each other. In these or other embodiments, the repair module 106 may be configured to generate a first repair for the particular code snippet using the modified repair candidate and the element map.

For instance, the modified repair candidate may include the generic element "x1" and the generic data type "X1" and, the particular code snippet may include the first element "e1" and the first data type "T1." The element map may indicate that the first element "e1" is mapped to the generic element "x1" and that the first data type "T1" is mapped to the generic data type "X1." Generation of the first repair for the particular code snippet may include replacing the generic element "x1" and the generic data type "X1" in the modified repair candidate with the first element "e1" and the first data type "T1" based on the mapping in the element map.

As another example, the repair module 106 may be configured to generate a second repair for the other particular code snippet using the modified repair candidate and the element map. For instance, the other particular code snippet may include the second element "e2" and the second data type "T2." The element map may indicate that the second element "e2" is mapped to the generic element "x1" and that the second data type "T2" is mapped to the generic data type "X1." Generation of the second repair for the other particular code snippet may include replacing the generic element "x1" and the generic data type "X1" in the modified repair candidate with the first element "e1" and the first data type "T1" based on the mapping in the element map.

In some embodiments, the repair module 106 may also be configured to perform repairs on the code under test 104 based on the concretized repairs. For example, the repair module 106 may implement the first repair at the particular code snippet as a potential repair of the particular fault that may be found with respect to the particular code statement that is included in the particular code snippet. In these or other embodiments, the repair module 106 may implement the second repair at the other particular code snippet.

In these or other embodiments, the repair module 106 may be configured to apply one or more of the test suites 111 with respect to the code under test 104 to determine whether the implemented repairs corrected the corresponding faults. In response to passing test executions, the repair module 106 may keep the implemented repairs to generate the modified code under test 108. In contrast, in response to one or more failing test executions, in some embodiments, the repair module 106 may select another abstract program modification as another repair candidate and may concretize the other repair candidate in a manner similar to that described above.

Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the repair module 106, the test suites 111, and the repair template 112 may be combined such that they may be considered the same element or may have common sections that may be considered part of two or more of the repair module 106, the test suites 111, and the repair template 112.

Additionally, the above operations related to generation of repairs for related code-clones may be performed with respect to any number of sets of related code-clones in parallel or in series. Moreover, the number of code snippets that may be considered related code-clones with respect to each other and that may be repaired in a multi-hunk manner as described above may vary and is not limited to only two even though the example above focuses mainly on generating repairs for two code snippets.

Figure 2:
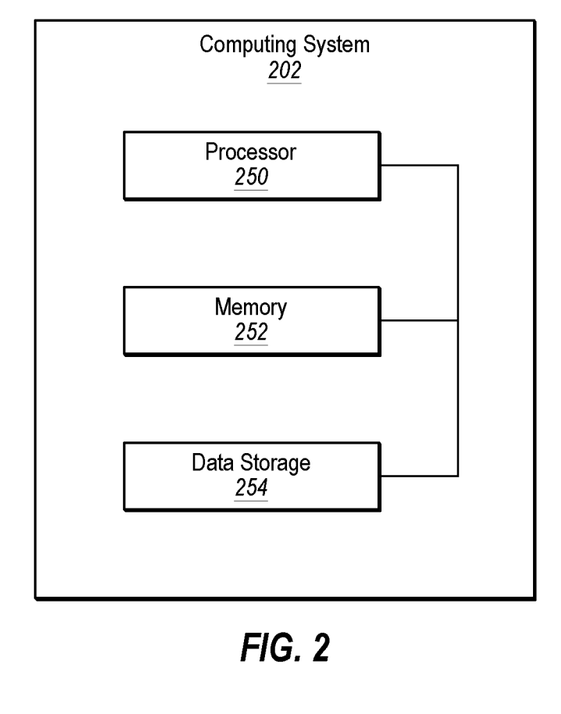
FIG. 2 illustrates an example computing system that may be configured to repair a software program.

FIG. 2 illustrates a block diagram of an example computing system 202, according to at least one embodiment of the present disclosure. The computing system 202 may be configured to implement or direct one or more operations associated with a repair module (e.g., the repair module 106). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available non-transitory media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re *Nuijten,* 500 F.3d 1346 (Fed. Cir. 2007). Combinations of the above may also be included within the scope of computer-readable media.

Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
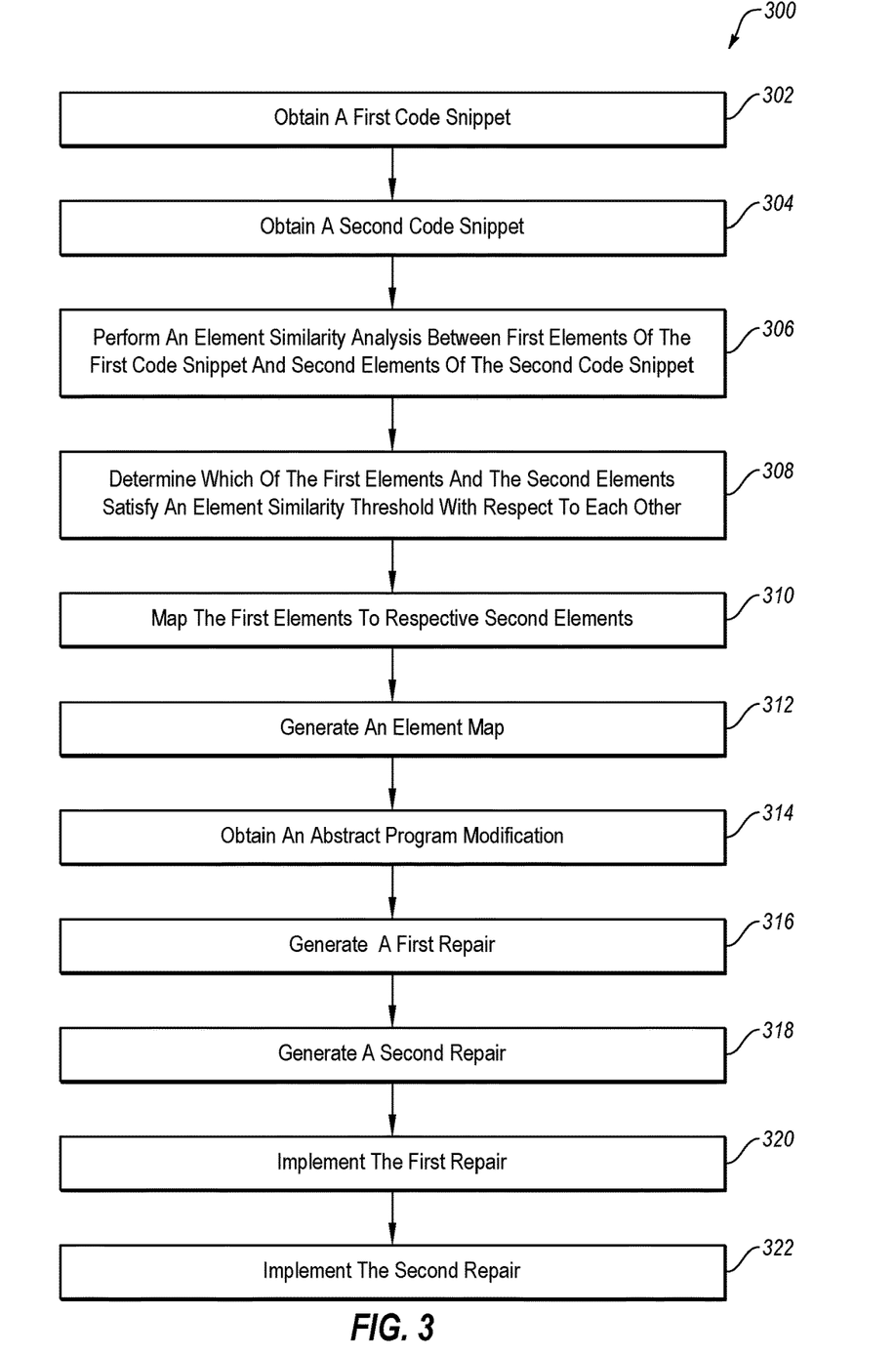
FIG. 3 is a flowchart of an example method of repairing a software program.

FIG. 3 is a flowchart of an example method 300 of repairing a software program, according to at least one embodiment described in the present disclosure. The method 300 may be performed by any suitable system, apparatus, or device with respect to code under test. For example, the repair module 106 of FIG. 1 or the computing system 202 of FIG. 2 (e.g., as directed by a repair module) may perform one or more of the operations associated with the method 300 with respect to the code under test 104. Although illustrated with discrete blocks, the steps and operations associated with one or more of the blocks of the method 300 may be divided into additional blocks, combined into fewer blocks, or eliminated, depending on the particular implementation.

The method 300 may begin at block 302, at which a first code snippet may be obtained. As described above, the first code snippet may include one or more lines of code that are adjacent to a first code statement of a software program that is identified as a fault location of a fault of the software program.

At block 304, a second code snippet may be obtained. As described above, the second code snippet may include one or more lines of code that are adjacent to a second code statement of the software program. In some embodiments, the second code statement may be identified as another fault location of another fault of the software program. Alternatively, the second code statement may not have been identified as a fault location.

In these or other embodiments, the second code statement may have been determined as being similar to the first code statement such as described above. For example, in some embodiments, determining that the second code statement is similar to the first code statement may be based on one or more of the following factors (such as described above with respect to FIG. 1): a textual similarity between the first code statement and the second code statement; a statement type similarity between the first code statement and the second code statement; an expression type similarity between first elements of the first code statement and second elements of the second code statement; a data type similarity between the first elements of the first code statement and the second elements of the second code statement; a structural similarity between the first code statement and the second code statement; and application program interface (API) use by the first code statement and the second code statement. In these or other embodiments, the second code statement may be identified as being similar to the first code statement in response to the second code statement being identified as satisfying a statement similarity threshold with respect to the first code statement, such as described above with respect to FIG. 1.

In these or other embodiments, the first code snippet and the second code snippet may be obtained in response to determining that the second code statement is similar to the first code statement. Additionally or alternatively, in instances in which the second code statement is identified as another fault location, the second code statement may be selected to determine whether the second code statement is similar to the first code statement in response to the second code statement being identified as another fault location.

At block 306, an element similarity analysis may be performed between first elements of the first code snippet and second elements of the second code snippet. In some embodiments, the element similarity analysis may be based on one or more of the following factors (such as described above with respect to FIG. 1): textual similarity between first identifiers of the first elements and second identifiers of the second elements; expression type similarity between the first elements and the second elements; and data type similarity between the first elements and the second elements.

At block 308, it may be determined, based on the element similarity analysis, which of the first elements and the second elements satisfy an element similarity threshold with respect to each other, such as described above with respect to FIG. 1. At block 310, first elements that are determined to be similar to second elements (may be mapped to each other, such as described above with respect to FIG. 1. For example, first elements may be mapped to respective second elements with which the first elements satisfy the element similarity threshold. In these or other embodiments, a generic element may be mapped to each set of mapped together first elements and second elements such as described above with respect to FIG. 1. Additionally or alternatively, data types of the first code snippet and the second code snippet that are determined to be similar to each other may be mapped together. In these or other embodiments, a generic data type may be mapped to each set of mapped together data types, such as described above.

At block 312, an element map may be generated. The element map may indicate the mapping performed at block 310. For example, the element map may indicate the mapping of the first elements of the first code snippet to the second elements of the second code snippet, such as described above with respect to FIG. 1. In these or other embodiments, the element map may also indicate the mapping of the generic elements to the sets of mapped together first elements and second elements, such as described above. Additionally or alternatively, as described above, the element map may indicate the mapping of data types of the first code snippet and the second code snippet. In these or other embodiments, the element map may indicate the mapping of generic data types to each set of mapped together data types, such as described above.

At block 314, an abstract program modification may be obtained as a repair candidate that may be used to repair faults located at the first code snippet and the second code snippet. In some embodiments, the obtained repair candidate may be an abstract program modification in that the repair candidate may have generic placeholders for the different elements and data types of the repair candidate, such as discussed above with respect to FIG. 1.

At block 316, a first repair may be generated for implementation with respect to the first code snippet. The first repair may be based on the abstract program modification and the element map. For example, as described above with respect to FIG. 1, the abstract program modification may be concretized to include one or more of the first elements of the first code snippet using the element map. In these or other embodiments, the abstract program modification may be concretized to include one or more first data types of the first code snippet using the element map. The first repair may be the abstract program modification that has been concretized to include the first elements and/or the first data types.

At block 318, a second repair may be generated for implementation with respect to the second code snippet. The second repair may be based on the abstract program modification and the element map. For example, as described above with respect to FIG. 1, the abstract program modification may be concretized to include one or more of the second elements of the second code snippet using the element map. In these or other embodiments, the abstract program modification may be concretized to include one or more second data types of the second code snippet using the element map. The second repair may be the abstract program modification that has been concretized to include the second elements and/or the second data types.

In some embodiments, the same abstract program modification may be used to generate the first repair and the second repair in response to a determination that the first code snippet and the second code snippet are related code-clones with respect to each other. In some embodiments, a snippet similarity analysis may be performed with respect to the first code snippet and the second code snippet. In these or other embodiments, the first code snippet and the second code snippet may be determined to be related code-clones with respect to each other based on the snippet similarity analysis.

In some embodiments, the snippet similarity may be determined based on a comparison between a first abstract code snippet related to the first code snippet and a second abstract code snippet related to the second code snippet, such as described above with respect to FIG. 1. Further, as detailed above with respect to FIG. 1, in some embodiments, the first abstract code snippet may be obtained by replacing the first elements of the first code snippet with the respective generic elements that are mapped to the first elements as indicated by the element map. In these or other embodiments, the first abstract code snippet may be obtained by replacing the first data types of the first code snippet with the respective generic data types that are mapped to the first data types as indicated by the element map. Similarly, in some embodiments, the second abstract code snippet may be obtained by replacing the second elements of the second code snippet with the respective generic elements that are mapped to the second elements as indicated by the element map. In these or other embodiments, the second abstract code snippet may be obtained by replacing the second data types of the second code snippet with the respective generic data types that are mapped to the second data types as indicated by the element map.

Additionally or alternatively, the snippet similarity may be determined based on the element map. For example, as detailed above, the first code snippet may be determined to be similar to the second code snippet based on first elements of the first code snippet being mapped to second elements of the second code snippet in the element map. In some embodiments, the first code snippet may be determined to be similar to the second code snippet based on each first elements of the first code snippet being mapped to one of the second elements of the second code snippet in the element map in which one or more particular first elements may be mapped to different second elements. In these or other embodiments, the first code snippet may be determined to be similar to the second code snippet based on each element of interest of the first elements being mapped to an element of interest of the second elements of the second code snippet in the element map.

At block 320, the first repair may be implemented at the first code snippet. At block 322, the second repair may be implemented at the second code snippet. In some embodiments, the first repair and the second repair may be implemented as potential repairs and further testing may be performed to determine whether the first repair and/or the second repair corrected respective faults. In some embodiments, the first repair and the second repair may be kept in response to passing test executions. Additionally or alternatively, in response to one or more failing test executions with the first repair and the second repair implemented, the method may return to block 314 where another abstract program modification may be selected as another repair candidate and the operations of blocks 316, 318, 320, and 322 may be performed with respect to the other abstract program modification.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For example, the mapping of elements and generation of the element map may be the same operation in some embodiments. Additionally, the method 300 is described with respect to a first code statement, a first code snippet, a first repair, a second code statement, a second code snippet, and a second repair. However, any number of code statements, code snippets, and/or repairs may be analyzed, determined, or generated with respect to a same type of fault and/or the abstract program modification without departing from the scope of the present disclosure.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a first code snippet that includes one or more lines of code that are adjacent to a first code statement of a software program that is identified as a fault location of a fault of the software program;
   obtaining a second code snippet that includes one or more lines of code that are adjacent to a second code statement that is identified as satisfying a statement similarity threshold with respect to the first code statement;
   performing an element similarity analysis between first elements of the first code snippet and second elements of the second code snippet;
   determining, based on the element similarity analysis, which of the first elements and the second elements satisfy an element similarity threshold with respect to each other;
   mapping the first elements to respective second elements with which the first elements satisfy the element similarity threshold;
   mapping a generic element to each set of mapped together first elements and second elements;
   generating an element map that indicates the mapping of the first elements to the respective second elements and that indicates a mapping of the first elements and respective second elements to respective generic elements;
   obtaining an abstract program modification as a repair candidate of the fault, the abstract program modification including a generic placeholder for each of one or more elements of the repair candidate in which each generic placeholder corresponds to a respective generic element of the element map;
   generating a first repair for implementation with respect to the first code snippet in which the first repair is based on the first code snippet, the abstract program modification and the element map and in which each generic placeholder of the abstract program modification is replaced with a respective first element based on the mapping of the first elements to the respective generic elements that correspond to the respective generic placeholders;
   generating a second repair for implementation with respect to the second code snippet in which the second repair is based on the abstract program modification and the element map;
   implementing the first repair at the first code snippet; and
   implementing the second repair at the second code snippet.

2. The method of claim 1, further comprising:
   generating a first abstract code snippet by replacing the first elements of the first code snippet with the respective generic elements that are mapped to the first elements;
   generating a second abstract code snippet by replacing the second elements of the second code snippet with the respective generic elements that are mapped to the second elements;
   performing a snippet similarity analysis between the first abstract code snippet and the second abstract code snippet; and
   determining that the first code snippet and the second code snippet are related code-clones based on the snippet similarity analysis, wherein both the first repair and the second repair are based on the repair candidate in response to determining that the first code snippet and the second code snippet are related code-clones with respect to each other.

3. The method of claim 1, further comprising:
   performing a snippet similarity analysis between the first code snippet and the second code snippet based on the element map; and
   determining that the first code snippet and the second code snippet are related code-clones based on the snippet similarity analysis, wherein both the first repair and the second repair are based on the repair candidate in response to determining that the first code snippet and the second code snippet are related code-clones with respect to each other.

4. The method of claim 1, wherein the obtaining the first code snippet and the second code snippet is in response to the second code statement being identified as satisfying the statement similarity threshold with respect to the first code statement.

5. The method of claim 4, wherein the identifying that the second code statement satisfies the statement similarity threshold with respect to the first code statement is based on one or more of: a textual similarity between the first code statement and the second code statement; a statement type similarity between the first code statement and the second code statement; an expression type similarity between first elements of the first code statement and second elements of the second code statement; a data type similarity between the first elements of the first code statement and the second elements of the second code statement; a structural similarity between the first code statement and the second code statement; and application program interface (API) use by the first code statement and the second code statement.

6. The method of claim 4, wherein the second code statement is identified as another fault location of another fault of the software program and the second code statement is selected to determine whether the second code statement satisfies the statement similarity threshold with respect to the first code statement in response to the second code statement being identified as another fault location.

7. The method of claim 1, wherein the element similarity analysis is based on one or more of: textual similarity between first identifiers of the first elements and second identifiers of the second elements; expression type similarity between the first elements and the second elements; and data type similarity between the first elements and the second elements.

8. One or more non-transitory computer-readable storage media configured to store instructions that, in response to being executed, cause a system to perform operations, the operations comprising:
   obtaining a first code snippet that includes one or more lines of code that are adjacent to a first code statement of a software program that is identified as a fault location of a fault of the software program;
   obtaining a second code snippet that includes one or more lines of code that are adjacent to a second code statement that is identified as satisfying a statement similarity threshold with respect to the first code statement;
   performing an element similarity analysis between first elements of the first code snippet and second elements of the second code snippet;
   determining, based on the element similarity analysis, which of the first elements and the second elements satisfy an element similarity threshold with respect to each other;
   mapping the first elements to respective second elements with which the first elements satisfy the element similarity threshold;
   generating an element map that indicates the mapping of the first elements to the respective second elements and that indicates a mapping of the first elements and respective second elements to respective generic elements;
   mapping a generic element to each set of mapped together first elements and second elements;
   obtaining an abstract program modification as a repair candidate of the fault, the abstract program modification including a generic placeholder for each of one or more elements of the repair candidate in which each generic placeholder corresponds to a respective generic element of the element map;
   generating a first repair for implementation with respect to the first code snippet in which the first repair is based on the first code snippet, the abstract program modification and the element map and in which each generic placeholder of the abstract program modification is replaced with a respective first element based on the mapping of the first elements to the respective generic elements that correspond to the respective generic placeholders;
   generating a second repair for implementation with respect to the second code snippet in which the second repair is based on the abstract program modification and the element map;
   implementing the first repair at the first code snippet; and
   implementing the second repair at the second code snippet.

9. The one or more non-transitory computer-readable storage media of claim 8, wherein the operations further comprise:
   generating a first abstract code snippet by replacing the first elements of the first code snippet with the respective generic elements that are mapped to the first elements;
   generating a second abstract code snippet by replacing the second elements of the second code snippet with the respective generic elements that are mapped to the second elements;
   performing a snippet similarity analysis between the first abstract code snippet and the second abstract code snippet; and
   determining that the first code snippet and the second code snippet are related code-clones based on the snippet similarity analysis, wherein both the first repair and the second repair are based on the repair candidate in response to determining that the first code snippet and the second code snippet are related code-clones with respect to each other.

10. The one or more non-transitory computer-readable storage media of claim 8, wherein the operations further comprise:
   performing a snippet similarity analysis between the first code snippet and the second code snippet based on the element map; and
   determining that the first code snippet and the second code snippet are related code-clones based on the snippet similarity analysis, wherein both the first repair and the second repair are based on the repair candidate in response to determining that the first code snippet and the second code snippet are related code-clones with respect to each other.

11. The one or more non-transitory computer-readable storage media of claim 8, wherein the obtaining the first code snippet and the second code snippet is in response to the second code statement being identified as satisfying the statement similarity threshold with respect to the first code statement.

12. The one or more non-transitory computer-readable storage media of claim 11, wherein the identifying that the second code statement satisfies the statement similarity threshold with respect to the first code statement is based on one or more of: a textual similarity between the first code statement and the second code statement; a statement type similarity between the first code statement and the second code statement; an expression type similarity between first elements of the first code statement and second elements of the second code statement; a data type similarity between the first elements of the first code statement and the second elements of the second code statement; a structural similarity between the first code statement and the second code statement; and application program interface (API) use by the first code statement and the second code statement.

13. The one or more non-transitory computer-readable storage media of claim 11, wherein the second code statement is identified as another fault location of another fault of the software program and the second code statement is selected to determine whether the second code statement satisfies the statement similarity threshold with respect to the first code statement in response to the second code statement being identified as another fault location.

14. The one or more non-transitory computer-readable storage media of claim 8, wherein the element similarity analysis is based on one or more of: textual similarity between first identifiers of the first elements and second identifiers of the second elements; expression type similarity between the first elements and the second elements; and data type similarity between the first elements and the second elements.

15. A system comprising:
one or more computer-readable storage media configured to store instructions; and
one or more processors communicatively coupled to the one or more computer-readable storage media and configured to, in response to execution of the instructions, cause the system to perform operations, the operations comprising:
obtaining a first code snippet that includes one or more lines of code that are adjacent to a first code statement of a software program that is identified as a fault location of a fault of the software program;
obtaining a second code snippet that includes one or more lines of code that are adjacent to a second code statement that is identified as satisfying a statement similarity threshold with respect to the first code statement;
performing an element similarity analysis between first elements of the first code snippet and second elements of the second code snippet;
determining, based on the element similarity analysis, which of the first elements and the second elements satisfy an element similarity threshold with respect to each other;
mapping the first elements to respective second elements with which the first elements satisfy the element similarity threshold;
mapping a generic element to each set of mapped together first elements and second elements;
generating an element map that indicates the mapping of the first elements to the respective second elements and that indicates a mapping of the first elements and respective second elements to respective generic elements;
obtaining an abstract program modification as a repair candidate of the fault, the abstract program modification including a generic placeholder for each of one or more elements of the repair candidate in which each generic placeholder corresponds to a respective generic element of the element map;
generating a first repair for implementation with respect to the first code snippet in which the first repair is based on the first code snippet, the abstract program modification and the element map and in which each generic placeholder of the abstract program modification is replaced with a respective first element based on the mapping of the first elements to the respective generic elements that correspond to the respective generic placeholders;
generating a second repair for implementation with respect to the second code snippet in which the second repair is based on the abstract program modification and the element map;
implementing the first repair at the first code snippet; and
implementing the second repair at the second code snippet.

16. The system of claim 15, wherein the operations further comprise:
generating a first abstract code snippet by replacing the first elements of the first code snippet with the respective generic elements that are mapped to the first elements;
generating a second abstract code snippet by replacing the second elements of the second code snippet with the respective generic elements that are mapped to the second elements;
performing a snippet similarity analysis between the first abstract code snippet and the second abstract code snippet; and
determining that the first code snippet and the second code snippet are related code-clones based on the snippet similarity analysis, wherein both the first repair and the second repair are based on the repair candidate in response to determining that the first code snippet and the second code snippet are related code-clones with respect to each other.

17. The system of claim 15, wherein the operations further comprise:
performing a snippet similarity analysis between the first code snippet and the second code snippet based on the element map; and
determining that the first code snippet and the second code snippet are related code-clones based on the snippet similarity analysis, wherein both the first repair and the second repair are based on the repair candidate in response to determining that the first code snippet and the second code snippet are related code-clones with respect to each other.

18. The system of claim 15, wherein the obtaining the first code snippet and the second code snippet is in response to determining that the second code statement is similar to the first code statement.

19. The system of claim 18, wherein the identifying that the second code statement satisfies the statement similarity threshold with respect to the first code statement is based on one or more of: a textual similarity between the first code statement and the second code statement; a statement type similarity between the first code statement and the second code statement; an expression type similarity between first elements of the first code statement and second elements of the second code statement; a data type similarity between the first elements of the first code statement and the second elements of the second code statement; a structural similarity between the first code statement and the second code statement; and application program interface (API) use by the first code statement and the second code statement.

20. The system of claim 15, wherein the element similarity analysis is based on one or more of: textual similarity between first identifiers of the first elements and second identifiers of the second elements; expression type similarity between the first elements and the second elements; and data type similarity between the first elements and the second elements.

* * * * *